United States Patent
Itagaki et al.

(10) Patent No.: US 11,535,738 B2
(45) Date of Patent: Dec. 27, 2022

(54) RESIN SHEET

(71) Applicant: JSP CORPORATION, Tokyo (JP)

(72) Inventors: Ryosuke Itagaki, Tochigi (JP); Mitsuhiro Akiyama, Tochigi (JP)

(73) Assignee: JSP CORPORATION, Tokyo (JP)

( * ) Notice: Subject to any disclaimer, the term of this patent is extended or adjusted under 35 U.S.C. 154(b) by 455 days.

(21) Appl. No.: 16/638,806

(22) PCT Filed: Jul. 18, 2018

(86) PCT No.: PCT/JP2018/026943
§ 371 (c)(1),
(2) Date: Feb. 13, 2020

(87) PCT Pub. No.: WO2019/035308
PCT Pub. Date: Feb. 21, 2019

(65) Prior Publication Data
US 2021/0130600 A1 May 6, 2021

(30) Foreign Application Priority Data
Aug. 17, 2017 (JP) .............................. JP2017-157518

(51) Int. Cl.
*C08L 33/08* (2006.01)
*C08L 25/06* (2006.01)
*C08L 69/00* (2006.01)
*B29C 59/04* (2006.01)

(52) U.S. Cl.
CPC .............. *C08L 33/08* (2013.01); *C08L 25/06* (2013.01); *C08L 69/00* (2013.01); *B29C 59/04* (2013.01); *C08L 2201/10* (2013.01)

(58) Field of Classification Search
CPC ............................. B29C 59/04; B29C 59/043
See application file for complete search history.

(56) References Cited

U.S. PATENT DOCUMENTS

2008/0286527 A1 11/2008 Haga et al.
2012/0025245 A1* 2/2012 Nakamura .............. H01L 51/52
257/E51.019

FOREIGN PATENT DOCUMENTS

| JP | 2001-180949 | 7/2001 |
|---|---|---|
| JP | 2008-233870 | 10/2008 |
| JP | 2009-53623 | 3/2009 |
| JP | 2009-86208 | 4/2009 |
| JP | 2012-9408 | 1/2012 |
| JP | 2016-12095 | 1/2016 |
| JP | 2017-24291 | 2/2017 |

OTHER PUBLICATIONS

International Search Report (ISR) dated Aug. 28, 2018 in International (PCT) Application No. PCT/JP2018/026943.

* cited by examiner

*Primary Examiner* — Jeffrey C Mullis
(74) *Attorney, Agent, or Firm* — Wenderoth, Lind & Ponack, L.L.P.

(57) ABSTRACT

A resin sheet of the present invention is a checker glass-like resin sheet made of a transparent thermoplastic resin, and includes a plurality of sectional arch-shaped elongated protrusions extending in one direction are regularly arranged in rows on, one surface of the resin sheet; and a plurality of sectional arch-shaped elongated protrusions extending in a direction perpendicular to the protrusions arranged on the one surface are regularly arranged in rows, on another surface of the resin sheet, in which an arithmetic average waviness (Wa) at a vertex of the protrusion in a direction in which the protrusion extends is 20 μm or less on both surfaces of the resin sheet. Accordingly, there is provided a resin sheet that can be used as an alternative to checker glass and has a certain degree of visibility from a short distance while having a shielding property from a long distance.

9 Claims, 6 Drawing Sheets

SHORT DISTANCE OF EXAMPLE 1 (A1)

SHORT DISTANCE OF COMPARATIVE EXAMPLE 1 (B1)

LONG DISTANCE OF EXAMPLE 1 (A2)

LONG DISTANCE OF COMPARATIVE EXAMPLE 1 (B2)

RESIN SHEET

TECHNICAL FIELD

The present invention relates to a checker glass-like resin sheet made of a transparent thermoplastic resin.

BACKGROUND ART

The checker glass is also called waffle glass or mosaic glass, and due to high retro design, it is used for interiors such as antique interior doors and cupboards. A lattice pattern of the checker glass is formed in such a manner that sectional arch-shaped elongated protrusions extending in one direction are shaped to be arranged in rows on one surface at equal intervals and sectional arch-shaped elongated protrusions are shaped to be arranged in rows on the other surface at equal intervals extending in a direction perpendicular to the protrusion on the one surface so that the protrusions on the front and back are overlapped when viewed from the front surface so as to appear as a lattice pattern as a whole. The checker glass which has such a lattice pattern has the characteristic of having the visibility in a short distance, while having the shielding property from a long distance.

The checker glass having the above characteristics is usually manufactured by a roll-out method. The roll-out method is a manufacturing method in which a glass product is formed by passing glass melted directly between two upper and lower shaping rolls (for example, refer to Patent Literature 1). In the manufacture of this checker glass, the melted glass is rolled with two upper and lower shaping rolls to transfer the recessed groove of the roll onto the glass surface, thereby manufacturing the checker glass having sectional arch-shaped elongated protrusions. Regarding the two upper and lower shaping rolls, one of the shaping roll is formed with a number of recessed grooves continuous in a circumferential direction of the roll, and the other of the shaping roll is formed with a number of recessed grooves continuous in a width direction of the roll.

On the other hand, in the checker glass manufactured by the roll-out method described above, in the sectional arch-shaped elongated protrusions on the upper and lower surface formed by two shaping rolls, there was a disadvantage that the sectional arch-shaped elongated protrusions were deformed by their own weight on the manufacturing line after shaping, and waviness occurred in the direction in which the protrusions extended. In addition, when the molten glass came into contact with the shaping roll and was cooled rapidly, more heat escaped to the lower shaping roll, which is under own weight of the glass, and uniform cooling was not performed on both the upper and lower surfaces of the glass, and defects occurred on one side of the glass in particular, and thereby, it difficult to obtain the checker glass having the waviness suppressed on both surfaces.

The waviness of the protrusion generated due to such a cause has a problem in that the visibility at a short distance to the opposite surface is deteriorated. In addition, since it is made of glass, the checker glass has a problem that it lacks lightness, and it has a problem that it is easily broken by an impact and there is a risk of being injured by a broken piece at the time of breakage.

CITATION LIST

Patent Literature

Patent Literature 1: JP 2001-180949 A

SUMMARY OF INVENTION

Technical Problem

The present invention has been made in view of such a circumstance, and an object thereof is to provide a resin sheet that is capable of being used as an alternative to checker glass, and has a certain degree of visibility from a short distance while having a shielding property from a long distance, in the visibility of the resin sheet.

Solution to Problem

The present invention provides a resin sheet described below.

<1> A resin sheet which is a checker glass-like resin sheet made of a transparent thermoplastic resin, wherein a plurality of sectional arch-shaped elongated protrusions extending in one direction are regularly arranged in rows on one surface of the resin sheet, a plurality of sectional arch-shaped elongated protrusions extending in a direction perpendicular to the protrusions arranged on the one surface are regularly arranged in rows on another surface of the resin sheet, and an arithmetic average waviness (Wa) at a vertex of the protrusion in a direction in which the protrusion extends is 20 μm or less on both surfaces of the resin sheet.

<2> The resin sheet according to <1>, wherein on both surfaces of the resin sheet, a pitch of the protrusions is 10 to 40 mm, and an average height of the protrusions is 300 to 1500 μm.

<3> The resin sheet according to <1> or <2>, wherein a ratio of the arithmetic average waviness (Wa) of the vertex of the protrusion to a height of the protrusion on both surfaces of the resin sheet is 5% or less.

<4> The resin sheet according to any one of <1> to <3>, wherein the transparent thermoplastic resin is any one of a polystyrene resin, an acrylic resin, and a polycarbonate resin.

<5> The resin sheet according to any one of <1> to <4>, wherein a basis weight of the resin sheet is 2,000 to 5,000 g/m².

Advantageous Effects of Invention

A resin sheet of the present invention has a plurality of sectional arch-shaped elongated protrusions extending in one direction are regularly arranged in rows on one surface, and a plurality of sectional arch-shaped elongated protrusions extending in a direction perpendicular to the protrusions arranged on the one surface are regularly arranged in rows, on the other surface of the resin sheet, in which when an arithmetic average waviness (Wa) of vertexes of the protrusions is defined in a specific range, it has a certain degree of visibility from a short distance while achieving the shielding property from a long distance is achieved. Further, the resin sheet of the present invention is superior to glass in secondary workability such as cutting and bending and lightness, and even if it is broken, unlike glass, it can suppress the scattering of fragments.

BRIEF DESCRIPTION OF DRAWINGS

FIG. 2(*a*) is a plan view illustrating an example of a resin sheet in which groove portions extending directly on both surfaces are formed, and FIG. 2(*b*) is a longitudinal sectional view taken along line A-A of FIG. 2(*a*).

FIG. 3(*a*) is a schematic view illustrating an example of an apparatus, FIG. 3(*b*1) is a schematic view illustrating an example of a lateral groove roll, FIG. 3(*b*2) is a schematic view illustrating an example of a longitudinal groove roll, and FIG. 3(*c*) is a schematic view of a recessed groove formed on the roll surface.

FIG. 6(A1) is a photograph illustrating the visibility from a short distance of Example 1, FIG. 6(B1) is a photograph illustrating the visibility from a short distance of Comparative Example 1, FIG. 6(A2) is a photograph illustrating shielding property from a long distance of Example 1, and FIG. 6(B2) is a photograph illustrating the shielding property from a long distance of Comparative Example 1.

DESCRIPTION OF EMBODIMENTS

Figure 1:
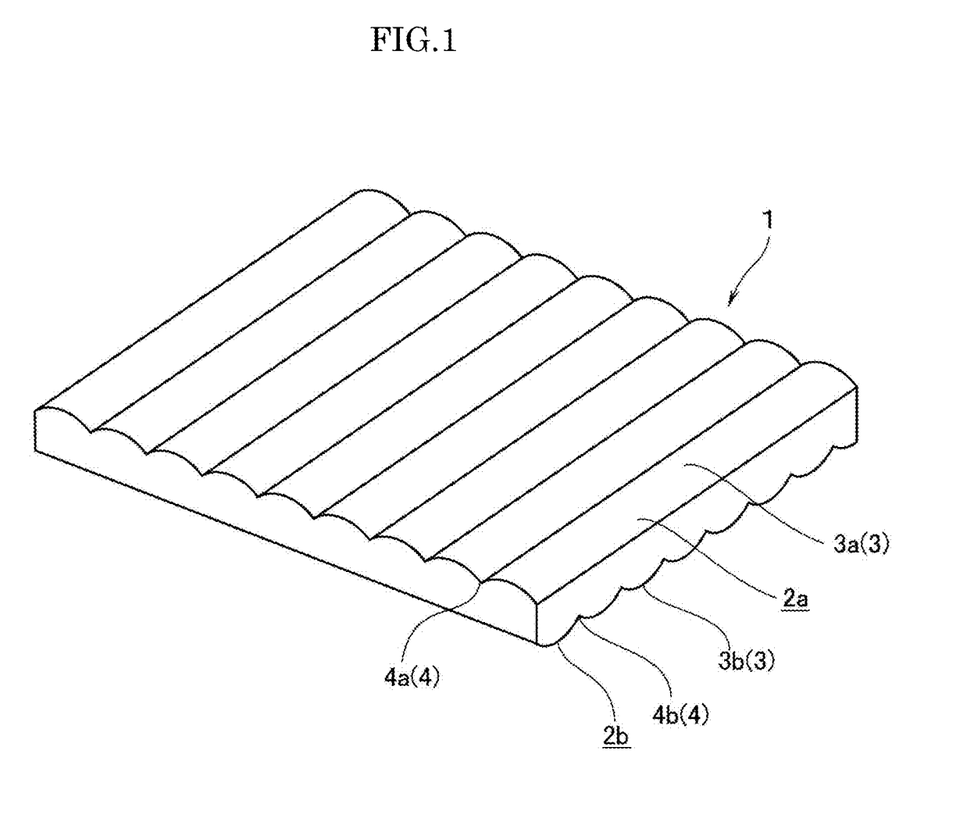
FIG. 1 is a schematic perspective view illustrating one embodiment of a resin sheet according to the present invention.
Figure 2:
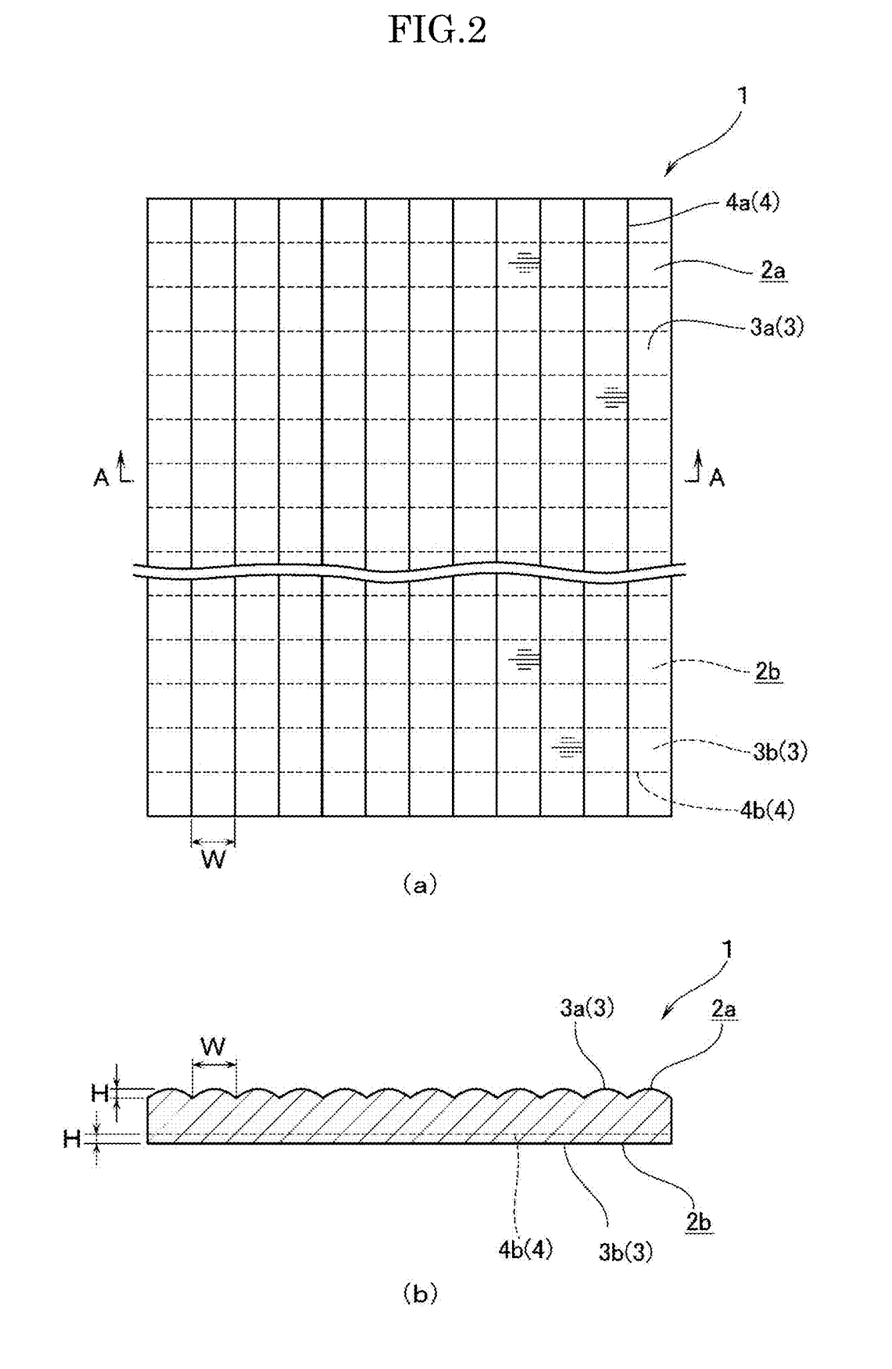

A resin sheet of the present invention will be specifically described below based on the drawings. FIG. 1 is a schematic perspective view illustrating one embodiment of a resin sheet according to the present invention, and FIG. 2(*a*) is a plan view illustrating an example of a resin sheet in which groove portions extending directly on both surfaces are formed, and FIG. 2(*b*) is a longitudinal sectional view taken along line A-A of FIG. 2(*a*).

A resin sheet 1 of the present invention is a checker glass-like resin sheet made of a transparent thermoplastic resin, in which a plurality of sectional arch-shaped elongated protrusions 3*a*(3) (hereinafter, also referred to as "protrusion") extending in one direction are regularly arranged in rows, on one surface 2*a* of the resin sheet 1, and a plurality of protrusions 3*b*(3) extending in a direction perpendicular to the protrusions 3*a*(3) arranged on the one surface 2*a* are regularly arranged in rows, on the other surface 2*b* of the resin sheet 1.

A width W of the protrusion 3 in the resin sheet 1 of the present embodiment is preferably 10 to 30 mm, more preferably 12 to 25 mm, and still more preferably 15 to 20 mm, from the viewpoint of securing the shielding property on the other side through the resin sheet from a long distance. In addition, a pitch of the protrusions 3 is preferably 10 to 40 mm or less, and more preferably 12 to 30 mm. When the width W and the pitch of the protrusions 3 are within the above range, the resin sheet 1 having excellent design can be obtained. In the present invention, the width of the protrusion 3 is the distance between groove portions 4 at both ends of sectional arch-shaped protrusion 3, and the pitch is a distance between a vertex of the sectional arch-shaped protrusion 3 and a vertex of the sectional arch-shaped protrusion 3 adjacent to the sectional arch-shaped protrusion 3.

In addition, in each of the one surface 2*a* and the other surface 2*b*, the width W and the pitch are preferably constant from the viewpoint of design and the visibility from a short distance, and more preferably, the width W and the pitch of the one surface and the other surface are constant on both surfaces. In addition, in a case where the values of the width W and the pitch coincide with each other, the sectional arch-shaped protrusions 3 are continuously arranged, which is particularly excellent in design. For this reason, it is preferable that the width W and the pitch coincide with each other on each of the one surface 2*a* and the other surface 2*b*, and it is particularly preferable that the width W and the pitch coincide with each other on both surfaces.

An average height H from the groove portion 4 to the vertex of the protrusion 3 is preferably 200 to 1700 μm. When the height H of the protrusion 3 is within the above range, the protrusion 3 is clear and the resin sheet 1 having the excellent design can be obtained. From such a viewpoint, the average height H of the protrusions 3 is preferably 300 to 1500 μm, and more preferably 400 to 800 μm. The height H formed on one surface 2*a* and the height H formed on the other surface 2*b* can be different heights, but are preferably the same as each other from the viewpoint of the design and the visibility from a short distance.

The width W, the pitch, and the average height H of the protrusion 3 can be obtained by measuring the cross-sectional shape of the surface of the resin sheet 1 using, for example, a surface roughness measuring machine. As the surface roughness measuring machine, for example, Surfcoder SE1700α manufactured by Kosaka Laboratory Ltd. can be used.

In the resin sheet 1 of the present embodiment, the arithmetic average waviness (Wa) at the vertex of the protrusion 3 in the direction in which the protrusion 3 extends is 20 μm or less on both surfaces of the resin sheet 1. When the arithmetic average waviness (Wa) is set within the above range, the distortion of the contour of the object visually recognized through the resin sheet 1 can be reduced, and thereby the resin sheet 1 has a shielding property from a long distance and a certain degree of visibility from a short distance. From the above viewpoint, the arithmetic average waviness (Wa) is preferably 15 μm or less on both surfaces, and more preferably 13 μm or less. Further, it is preferable that the arithmetic average waviness is also low even at the point other than the vertex of the protrusion 3 in the direction in which the protrusion 3 extends, and specifically, in each of the groove portions 4(P1), and (P5) of the protrusion, and the intermediate portions (P2) and (P4) between the groove portion 4 and the vertex illustrated in FIG. 4, both surfaces of the resin sheet 1 are preferably 50 μm or less, more preferably 40 μm or less, and further preferably 30 μm or less. The arithmetic average waviness (Wa) in the present invention can be measured using, for example, an ultra-precision non-contact three-dimensional measuring apparatus (model: NH-3SP) manufactured by Mitaka Kohki Co., Ltd. By calculating based on JIS B0601:2013 from this measurement, the value of each arithmetic average waviness can be obtained.

In the resin sheet 1 of the present embodiment, the ratio of the arithmetic average waviness (Wa) of the vertex of the protrusion 3 to the height H of the protrusion 3 is preferably 5% or less on both surfaces of the resin sheet 1. By setting the ratio of the arithmetic average waviness (Wa) of the vertex of the protrusion 3 to the height H of the protrusion 3 within the above range, it is possible to obtain the resin sheet 1 having a good balance between the height H of the protrusion 3 and the visibility. From the above viewpoint, the ratio of the arithmetic average waviness (Wa) is preferably 3% or less, and more preferably 2% or less.

Further, from the viewpoint of scratch resistance of the resin sheet 1, the surface of the resin sheet 1 preferably has a hardness of "2B" or more in a pencil hardness test, more preferably has a hardness of "HB" or more, and further preferably has a hardness of "2H" or more. It is preferable that both surfaces of the resin sheet 1 are surfaces satisfying the above hardness. The pencil hardness test is defined in JIS K5600-5-4 (1999).

The characteristics of the resin sheet 1 of the present invention are excellent daylighting to transmit light to the same extent as a glass checker glass, the shielding property from a long distance, and the excellent visibility from a short distance. The light transmittivity is quantified by the total light transmittance. The total light transmittance represents the ratio of light transmitted through the resin sheet 1, and the larger the total light transmittance, the easier the light passes from the front side to the back side of the resin sheet 1. From such a viewpoint, the total light transmittance is preferably 85% or more, and more preferably 90% or more. The total light transmittance, diffuse light transmittance, and parallel light transmittance can be measured using a turbidimeter (for example, Haze Meter NDH7000SP manufactured by Nippon Denshoku Industries Co., Ltd.) according to JIS K7361-1:1997.

Further, the visibility from a short distance can be defined by image clarity. The image clarity is a numerical value that serves as an index that indicates the degree to which the image of an object seen through the resin sheet 1 can be seen clearly without distortion, and the clearer the image, the higher the value. The measurement method is performed in such a manner that an optical comb perpendicular to a light axis of the transmitted light transmitted through the resin sheet 1 is moved to obtain light quantity (M) when the optical comb transmission part is on the light axis and light quantity (m) when there is the light blocking part of the optical comb, and the ratio (%) between the difference (M−m) and the sum (M+m) of both light quantity can be obtained. Specifically, the measurement can be performed by a method based on JIS K7374:2007.

Regarding the image clarity in the resin sheet 1 of the present invention, from the viewpoint of setting the visibility from a short distance within a specific range, a total value of the image clarity at optical comb widths 0.125 mm, 0.25 mm, 0.5 mm, 1 mm, and 2 mm is preferably 80% or more, and more preferably 90% or more. On the other hand, from the viewpoint of avoiding excessive visibility at a short distance, the image clarity in the resin sheet 1 of the present invention is preferably 200% or less, and more preferably 150% or less.

The basis weight of the resin sheet 1 is preferably 2,000 to 5,000 g/m$^2$, and more preferably 3,000 to 4,000 g/m$^2$. When the basis weight is in the above range, the resin sheet 1 is excellent in lightness and easy to handle as compared with the glass checker glass. In addition, since the resin sheet 1 is excellent in the secondary workability such as cutting, the vertical and horizontal dimensions can be appropriately changed depending on the intended use.

As the transparent thermoplastic resin used in the present invention, a resin corresponding to "transparent plastic" described in JIS K7361:1997 is preferably used. Examples of the transparent thermoplastic resin include a polystyrene resin, a polypropylene resin, an acrylic resin, a polycarbonate resin, a thermoplastic polyester resin, and a cyclic olefin resin, and these can be used alone or two or more kinds thereof can be used in combination. Among these, from the viewpoint of excellent workability and the like, it is preferably any of a polystyrene resin, an acrylic resin, and a polycarbonate resin. Furthermore, an acrylic resin is particularly preferable from the viewpoint of excellent scratch resistance.

The polystyrene resin has a styrene-based unit or styrene component content of 50 mol % or more, preferably 70 mol % or more, and particularly preferably 80 mol % or more.

The acrylic resin is a homopolymer of acrylic acid alkyl ester and/or methacrylic acid alkyl ester (hereinafter collectively referred to as (meth)acrylic acid ester) or a copolymer of two or more (meth)acrylic acid esters, a (meth)acrylic acid ester copolymer having a unit based on (meth)acrylic acid ester is 50 mol % or more and a unit based on another comonomer is 50 mol % or less, and a mixture of two or more thereof. The (meth)acrylic acid is a concept including acrylic acid and methacrylic acid, and means one or both of them. Examples of the homopolymer or copolymer of the (meth)acrylic acid ester include polymethyl methacrylate, polyethyl methacrylate, polypropyl methacrylate, polybutyl methacrylate, polymethyl acrylate, polyethyl acrylate, a methyl methacrylate-ethyl methacrylate copolymer, a methyl methacrylate-butyl methacrylate copolymer, and a methyl methacrylate-ethyl acrylate copolymer. Among these, polymethyl methacrylate, polymethyl acrylate, a methyl methacrylate-ethyl methacrylate copolymer, or a methyl methacrylate-ethyl acrylate copolymer is preferable, and polymethyl methacrylate is more preferable.

Examples of the (meth)acrylic acid ester copolymer include a methyl methacrylate-styrene-butylene copolymer, a methyl (meth)acrylate-styrene copolymer, an ethyl (meth)acrylate-styrene copolymer, and a methyl methacrylate-acrylonitrile-butadiene-styrene copolymer. Among them, a methyl methacrylate-styrene-butylene copolymer or a methyl methacrylate-styrene copolymer is preferable.

Examples of the polycarbonate resin include bisphenol A (4,4'-dihydroxydiphenyl-2,2-propane) polycarbonate, bisphenol F (4,4'-dihydroxydiphenyl-2,2-methane) polycarbonate, bisphenol S (4,4'-dihydroxydiphenylsulfone) polycarbonate, and 2,2-bis (4-dihydroxyhexyl) propane) polycarbonate. Among them, optical grade polycarbonate resins are particularly preferable.

The density of the transparent thermoplastic resin used in the present invention is preferably 0.8 to 1.6 g/cm$^3$, more preferably 0.9 to 1.5 g/cm$^3$, and further preferably 1 to 1.3 g/cm$^3$. When the density of the transparent thermoplastic resin is within the above range, the resin sheet is excellent in lightness and easy to handle as compared with a glass plate. In addition, the density of the float glass generally used as a glass product is about 2.5 g/cm$^3$.

Various additives can be added to the transparent thermoplastic resin used as a material of the resin sheet 1 of the present invention as long as the effects of the present invention are not impaired. Examples of such additives include antioxidants, UV inhibitors, antistatic agents, flame retardants, metal deactivators, pigments, and dyes. The specific addition amount of the additive is preferably 10 parts by mass or less, and more preferably 5 parts by mass or less with respect to 100 parts by mass of the transparent thermoplastic resin.

The manufacturing method of the resin sheet 1 of the present invention may be a press molding method or a roll shaping method using a mold as long as the arithmetic average waviness (Wa) of the vertex of the protrusion 3 defined in the resin sheet 1 of the present invention can be 20 μm or less. From the viewpoint that the visibility from a short distance can be easily set within a specific range, it is preferable to manufacture by using the roll shaping method.

Figure 3:
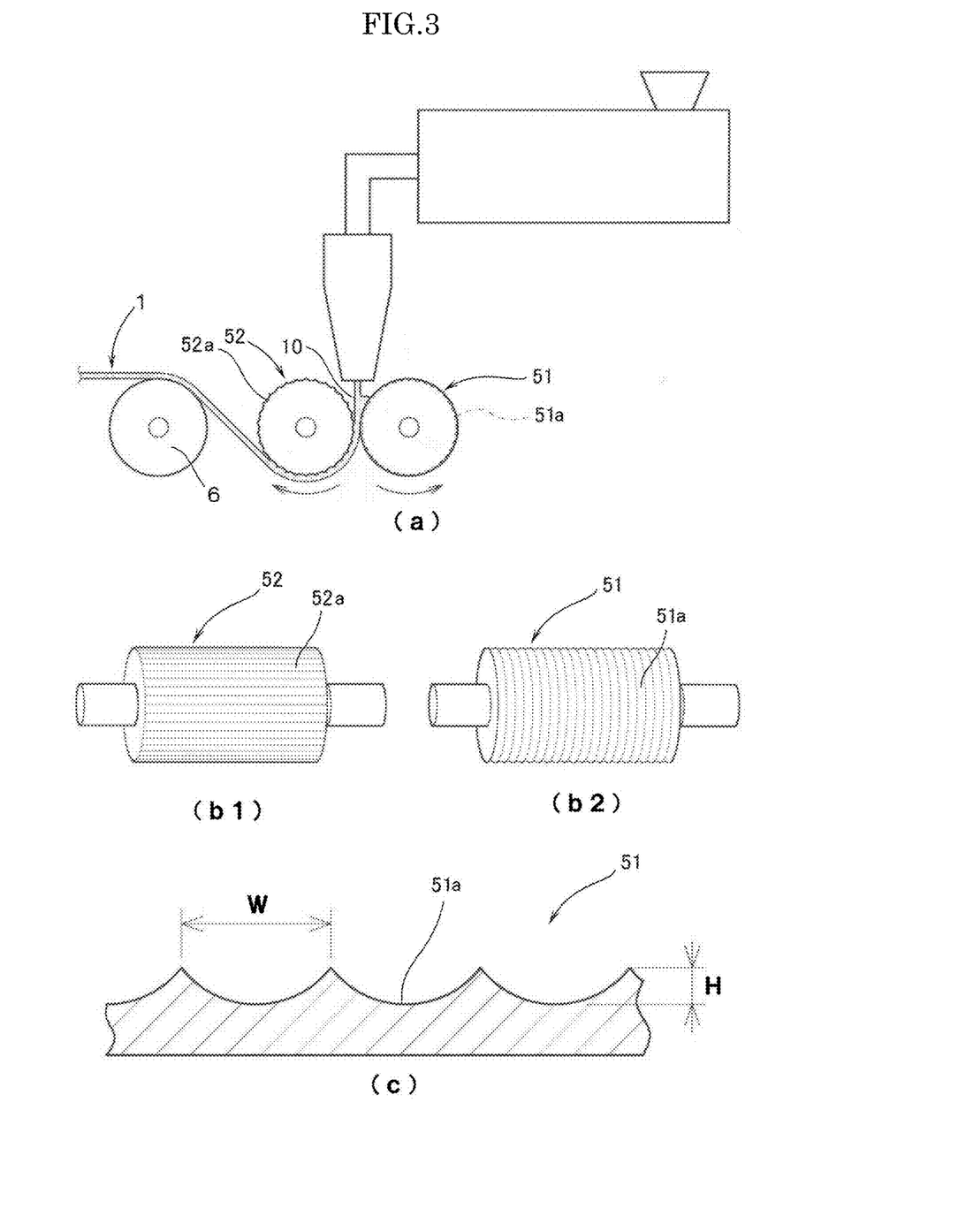

The roll shaping method is performed as follows. First, as illustrated in FIG. 3(a), a molten thermoplastic resin is extruded into a sheet shape. Next, the extruded transparent resin sheet 10 is clamped with a molding roll while the extruded transparent resin sheet 10 is taken up. Then, the surface shapes of the molding rolls 51 and 52 are transferred to both surfaces of the transparent resin sheet 10 to shape the protrusions 3 of the resin sheet 1. As for the shaping conditions of the transparent resin sheet 10, it is necessary to set the conditions of the take-up and the molding rolls so that the arithmetic average waviness (Wa) of the vertex of the protrusion 3 defined in the present invention is 20 µm or less. In addition, the molding roll is formed of a longitudinal groove roll 51 having a recessed groove 51a continuous in the circumferential direction of the roll illustrated in FIGS. 3(b2) and 3(c), and a lateral groove roll 52 having a recessed groove 52a continuous in the width direction of the roll illustrated in FIG. 3(b1).

The resin sheet 1 of the present invention manufactured by the above method can be suitably used for a daylighting window such as an antique-style indoor door or furniture, a partition material, a space separating material, a closet, or a cupboard door. In a case where the resin sheet 1 of the present invention is adopted for an indoor door, it has effects of the shielding property from a long distance and a certain degree of the visibility from a short distance. Therefore, it is expected to be used for partition materials that require specific privacy protection, such as doors of private rooms in nursing rooms and nursing homes, bathroom doors, and lighting windows.

EXAMPLES

Hereinafter, the resin sheet 1 of the present invention will be specifically described with reference to examples. However, the present invention is not limited to the examples.

Example 1

An extrusion apparatus in which a T die having a lip width of 300 mm (T die lip gap=5.0 mm, parallel land length of lip portion=5.0 mm) was attached to a single-screw extruder having an inner diameter of 65 mm was used.

Further, as illustrated in FIG. 3(a), a first roll 51 (longitudinal groove roll), a second roll 52 (lateral groove roll), and a third roll 6 (mirror surface roll) were arranged in this order, and rotation axes of the rolls were arranged to be the same height. All three rolls had a diameter of 195 mm, a width of 700 mm, and were made of iron, and had a flow path for flowing oil inside thereof to control the temperature of the rolls.

In the first roll 51 (longitudinal groove roll), a longitudinal groove in which a groove depth H of the recessed groove 51a was 500 µm, a width of a peak 0.05 mm below the tip of the peak was 0.7 mm, and a pitch was 15 mm was formed. In the second roll 52 (lateral groove roll), a lateral groove in which a groove depth H of the recessed groove 52a was 500 µm, a width of a peak 0.05 mm below the tip of the peak was 0.7 mm, and a pitch was 15 mm was formed. The third roll 6 was disposed such that the distance between the roll surface of the second roll 52 and the roll surface of the third roll 6 was 65 mm.

As a raw material, ESTYRENE MS resin (methyl methacrylate/styrene copolymer resin) "MS-600" manufactured by Nippon Steel & Sumikin Chemical Co., Ltd. (glass transition temperature Tg=103° C., total light transmittance 92%, haze=0.1, refractive index 1.53) was used.

An extruded resin temperature was set to 250° C., a resin was extruded from a T die into a sheet shape at a discharge rate of 45 kg/h, the extruded transparent resin sheet 10 was brought into contact with the second roll 52 to form a bank on the first roll 51 side, and was further clamped between the first roll 51 and the second roll 52 so that a longitudinal groove was formed on the first roll 51 side and a lateral groove was formed on the second roll side 52 of the transparent resin sheet 10. Further, the transparent resin sheet 10 was taken along the second roll 52 and then the third roll 6 at a take-up speed of 0.6 m/min to obtain a resin sheet 1 having a sheet width of 300 mm and a sheet thickness of 4 mm. The roll temperature was adjusted separately for each roll using three oil temperature control pumps (first roll at 60° C., second roll at 70° C., and third roll at 75° C.).

Example 2

A resin sheet 1 was obtained in the same manner as in Example 1 except that PS (polystyrene prepared by PSJ) was used as the raw material resin.

Comparative Example 1

A commercially available checker glass (glass thickness 4 mm, lattice size approximately 12.8 mm×14.8 mm) was used.

Comparative Example 2

A commercially available checker glass (glass thickness 4 mm, lattice size approximately 16.2 mm×17.2 mm) was used.

Comparative Example 3

A commercially available checker glass (glass thickness 4 mm, lattice size approximately 15.0 mm×15.6 mm) was used.

<Measurement of Width of Protrusion, Pitch, and Height of Protrusion>

The width of the sectional arch-shaped protrusion was obtained by the following method. First, a 100 mm×100 mm test piece was randomly cut out from each of the resin sheets of Examples 1 and 2 and the checker glass of Comparative Examples 1 to 3, and a cross-sectional shape was measured using a surface roughness measuring machine (Surfcoder SE1700α) manufactured by Kosaka Laboratory Ltd. in the direction perpendicular to the sectional arch-shaped protrusion. Next, the deepest points of the groove portions at both ends of the obtained sectional arch-shaped protrusion having an optional cross-sectional shape were connected by a straight line A, and the length of the straight line A was defined as the width of the protrusion. Regarding the pitch, a point which is a straight line parallel to the straight line A, and makes point contact with the peak of the protrusion was defined as a vertex of the protrusion, and a linear distance between adjacent vertices was defined as the pitch. In addition, a straight line B perpendicular to the straight line A was drawn from the vertex of the protrusion toward the bottom in the thickness direction of the resin sheet, and the length from the vertex of the peak of the protrusion in the straight line B to the intersection with the straight line A was measured, and then the height of the protrusion was obtained. The above operation was performed at four equally spaced points, and the arithmetic average values of the four points were respectively set as the width of the protrusion, the pitch and the height of the protrusion. The results are illustrated in Table 1.

<Measurement of Arithmetic Average Waviness (Wa)>

Figure 4:
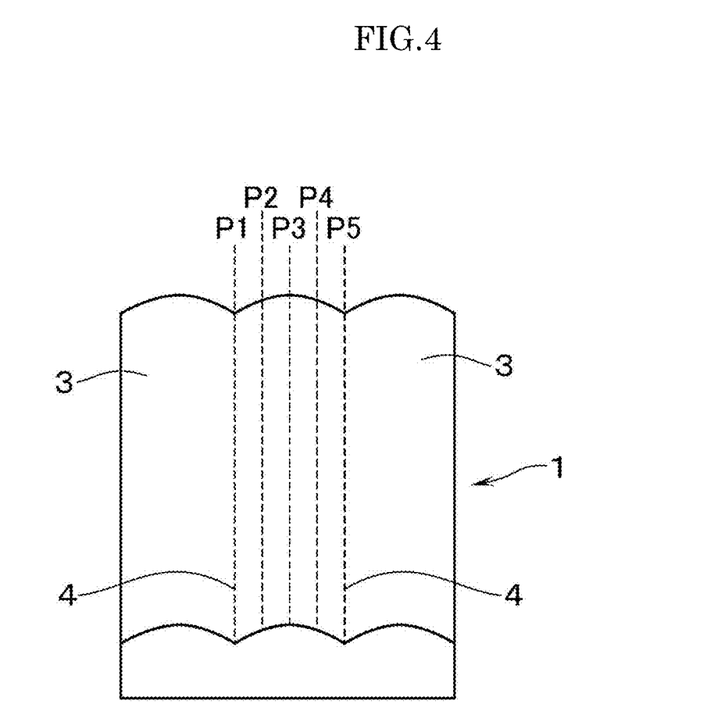
FIG. 4 is a schematic explanatory view illustrating measurement points of arithmetic average waviness (Wa) in examples.
Figure 5:
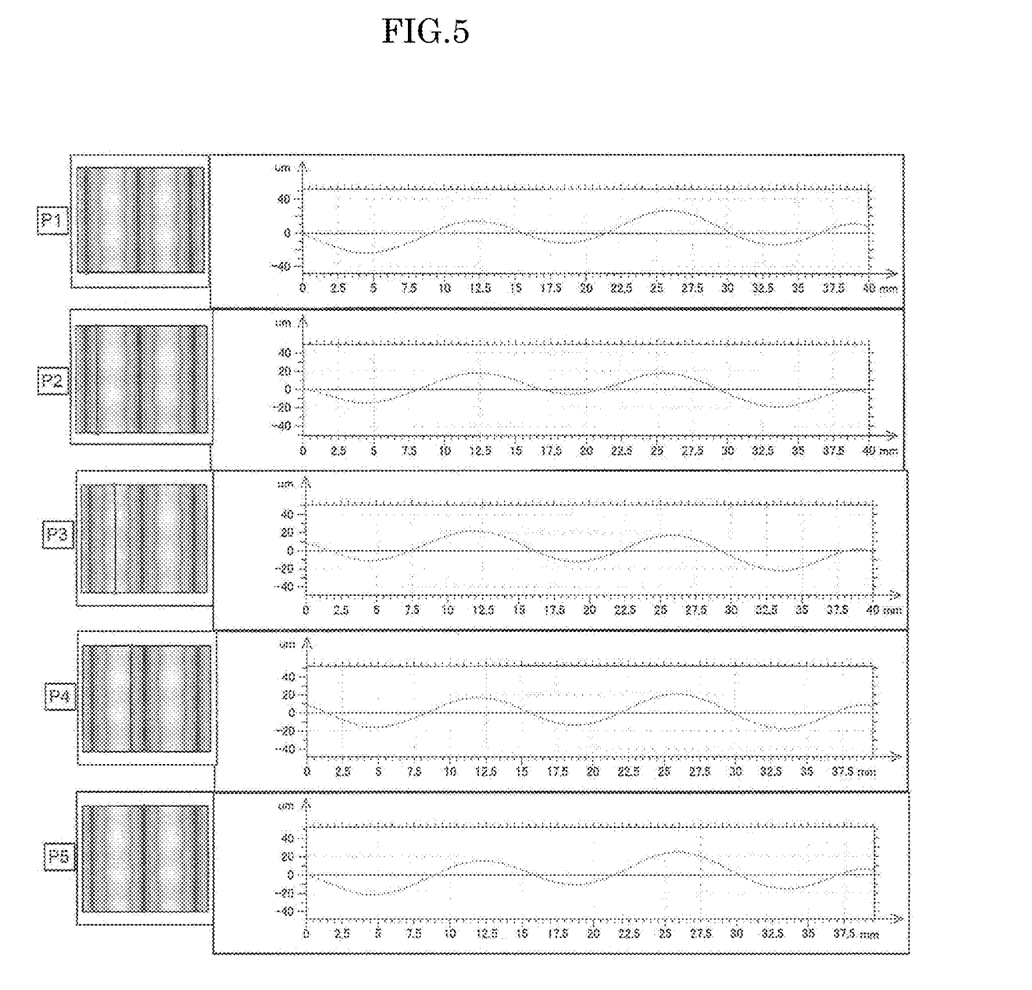
FIG. 5 is data of a 3D surface shape and arithmetic average waviness (Wa) of an upper surface of Example 1.

The arithmetic average waviness (Wa) was measured for the resin sheets of Examples 1 and 2 and the protrusions on the upper and lower surfaces of the checker glasses of Comparative Examples 1 to 3. Specifically, a 3D analysis image was extracted using an ultra-precision non-contact three-dimensional measuring apparatus (Model: NH-3SP, manufactured by Mitaka Kohki Co., Ltd.), and on the line in the length direction of each of the groove portions 4(P1) and (P5) of the protrusion, the vertex (P3) of the protrusion, and the intermediate parts (P2) and (P4) between the groove portion 4 and the vertex as illustrated in FIG. 4 on the 3D surface shape data, the measurement was performed under the conditions of cutoff $\lambda c=0.8$ mm, $\lambda f=8.0$ mm, and measurement distance of 40 mm. Based on JIS B0601:2013 from this measurement, the value of each arithmetic average waviness was obtained. The measurement result of the arithmetic average waviness (Wa) is indicated in Table 1, and the data of the 3D surface shape at each point on the upper surface of Example 1 is illustrated in FIG. 5. In addition, the ratio (%) of the vertex (P3) to the average height of each protrusion was obtained. The results are illustrated in Table 1.

<Evaluation of Waviness of Protrusion>

In addition, the average values of the arithmetic average waviness (Wa) measured at P1 to P5 on each of the upper and lower surfaces were obtained, and the waviness of the protrusion was evaluated based on the following criteria. The results are illustrated in Table 1.

Good . . . The average value of the arithmetic average waviness of the upper and lower surfaces of the resin sheet or checker glass is less than 50 µm.

Poor . . . The average value of the arithmetic average waviness of the upper and/or lower surface of the resin sheet or checker glass is 50 µm or more.

<Measurement and Evaluation of Image Clarity>

The image clarity was measured in a method based on JIS K7374:2007 for the longitudinal direction along the protrusions of the resin sheets of Examples 1 and 2 and the checker glass of Comparative Examples 1 to 3 and for the transverse direction perpendicular thereto. A test piece having a size of 20 mm×20 mm (thickness is the thickness of the resin sheet and the checker glass) was cut out from the resin sheet and the checker glass so as to include two groove portions in the longitudinal and transverse directions. In the measurement, by including a center portion having a lattice pattern of the test piece, the distance from an optical comb to a light receiving portion was set to 450 mm and the distance from the test piece to the light receiving portion was set to 230 mm for the longitudinal direction and the transverse direction perpendicular thereto, and the optical comb perpendicular to the light axis of the transmitted light was moved, and the image clarity was calculated by the following Equation (1) for each optical comb width (0.125 mm, 0.25 mm, 0.5 mm, 1 mm, 2 mm). In addition, ICM-1T manufactured by Suga Test Instruments Co., Ltd. was used as a measuring instrument.

$$C(n)=\{(M-m)/(M+m)\}\times 100(\%) \quad (1)$$

In Equation (1), C(n) is the image clarity (%) when the optical comb width is n (mm), M is the maximum light quantity when the optical comb width is n (mm), and m is the minimum light quantity when the optical comb width is n (mm).

Moreover, the average value in the longitudinal direction and the transverse direction in the width of each optical comb was calculated, the total value was calculated, and the value was evaluated as an index of the image clarity. The image clarity of 80% or more was evaluated as good, and the image clarity less than 80% was evaluated as poor. The results are indicated in Table 2.

<Evaluation of Visibility from Short Distance and Shielding Property from Long Distance>

The resin sheets of Examples 1 and 2 and the checker glasses of Comparative Examples 1 to 3 were evaluated for the visibility from a short distance and the shielding property from a long distance. For the visibility from a short distance, an object was placed 600 mm behind the resin sheet and the checker glass, and the appearance of the image of the object was visually evaluated through the resin sheet and the checker glass from 10 mm forward from the resin sheet and the checker glass. The visibility from a short distance where the image of the object on the opposite side was clearly visible was determined as good, and the visibility where the image of the object was not clearly visible was determined as poor. For the shielding property from a long distance, an object was placed 600 mm behind the resin sheet and the checker glass, and the appearance of the image of the object was visually evaluated through the resin sheet and the checker glass from 300 mm forward from the resin sheet and the checker glass. The shielding property from a long distance where the image of the object on the opposite side was clearly visible was determined as poor, and the shielding property where the image of the object was not clearly visible was determined as good. The results are indicated in Table 2.

Figure 6:
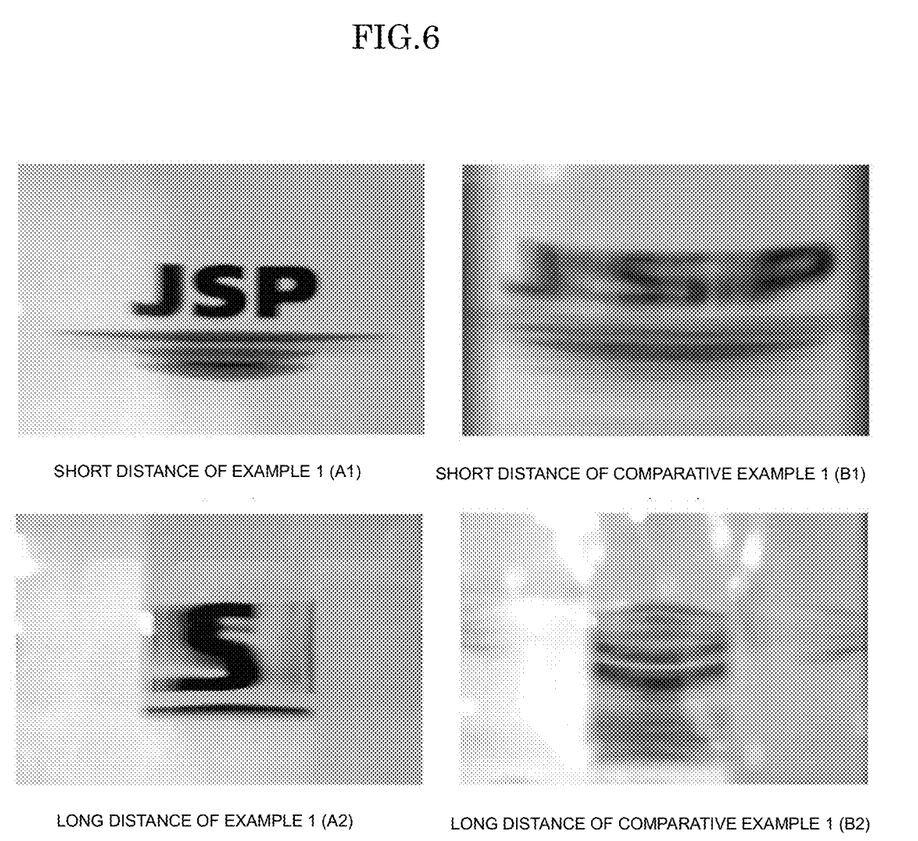

FIG. 6(A1) illustrates a photograph confirming the visibility from a short distance in Example 1, and FIG. 6(A2)

TABLE 1

| | Material | Surface | Average height (µm) of protrusion | Width (mm) of protrusion | Pitch (mm) of protrusion | Arithmetic average waviness Wa of protrusion (µm) | | | | | | Wa (P3)/ Protrusion average height ratio (%) | Evaluation of waviness of protrusion |
|---|---|---|---|---|---|---|---|---|---|---|---|---|---|
| | | | | | | P1 | P2 | P3 | P4 | P5 | Average value | | |
| Example 1 | MS600 | Upper | 560 | 16.8 | 16.8 | 11.7 | 9.6 | 10.3 | 10.4 | 11.1 | 10.6 | 1.8 | Good |
| | | Lower | 350 | 14.0 | 14.0 | 26.4 | 19.2 | 6.3 | 14.7 | 24.2 | 18.2 | 1.8 | |
| Example 2 | PS | Upper | 490 | 17.0 | 17.0 | 10.0 | 11.0 | 11.9 | 10.2 | 10.5 | 10.7 | 2.4 | Good |
| | | Lower | 340 | 14.0 | 14.0 | 22.7 | 14.6 | 8.9 | 14.5 | 23.5 | 16.8 | 2.6 | |
| Comparative Example 1 | Glass | Upper | 600 | 12.8 | 12.8 | 60.9 | 48.5 | 47.6 | 48.0 | 59.4 | 52.9 | 7.9 | Poor |
| | | Lower | 620 | 14.8 | 14.8 | 54.4 | 57.4 | 56.9 | 43.0 | 54.8 | 53.3 | 9.2 | |
| Comparative Example 2 | | Upper | 340 | 17.2 | 17.2 | 19.5 | 8.9 | 15.2 | 19.9 | 20.5 | 16.8 | 4.5 | Poor |
| | | Lower | 600 | 16.2 | 16.2 | 50.4 | 51.2 | 54.1 | 48.1 | 50.1 | 51.1 | 9.0 | |
| Comparative Example 3 | | Upper | 300 | 15.0 | 15.0 | 84.3 | 83.4 | 86.2 | 81.9 | 83.2 | 83.9 | 28.7 | Poor |
| | | Lower | 300 | 15.6 | 15.6 | 17.5 | 14.0 | 16.5 | 14.4 | 17.1 | 15.0 | 5.5 | | illustrates a photograph confirming the shielding property from a long distance in Example 1. FIG. 6(B1) illustrates a photograph confirming the visibility from a short distance of Comparative Example 1, and FIG. 6(B2) illustrates a photograph confirming the shielding property from a long distance of Comparative Example 1.

TABLE 2

| | Image clarity at each comb width (mm) (%) | | | | | | Visibility from short distance | Shielding property from long distance |
|---|---|---|---|---|---|---|---|---|
| | 0.125 | 0.25 | 0.5 | 1 | 2 | Total | Evaluation | | |
| Example 1 | 5 | 11 | 8 | 17 | 50 | 91 | Good | Good | Good |
| Example 2 | 4 | 11 | 18 | 16 | 51 | 99 | Good | Good | Good |
| Comparative Example 1 | 10 | 3 | 12 | 18 | 28 | 71 | Poor | Poor | Good |
| Comparative Example 2 | 5 | 3 | 7 | 14 | 34 | 61 | Poor | Poor | Good |
| Comparative Example 3 | 3 | 2 | 5 | 15 | 31 | 56 | Poor | Poor | Good |

<Test for Optical Properties>

For the resin sheets of Examples 1 and 2 and the checker glasses of Comparative Examples 1 to 3, total light transmittance, haze, parallel light transmittance, and diffuse light transmittance were measured as a test for the optical properties. Three test pieces having 20 mm×20 mm size (thickness is the thickness of the resin sheet and the checker glass) were cut out from the resin sheet and the checker glass so as to include two longitudinal and transverse groove portions, and the center portion of the lattice pattern of the test piece was measured in a measurement range of φ7 mm by using a haze meter (NDH7000SP, manufactured by Nippon Denshoku Industries Co., Ltd.), and thus the arithmetic averaged value was employed. The results are indicated in Table 3.

<Pencil Hardness>

For the resin sheets of Examples 1 and 2, using No. 553-S manufactured by Yasuda Seiki Seisakusho, Ltd., a pencil hardness test was conducted by a method based on JIS K5600-5-4 (1999) (angle of 45°, load of 750 g, speed of 1 mm/s, and a temperature of 23° C.). Note that the hardness in the pencil method is defined as "2B<B<HB<F<H<2H<3H<4H" when the higher hardness is defined as large. Table 3 indicates the results of the pencil hardness test.

TABLE 3

| | Total light transmittance (%) | Haze (%) | Parallel light transmittance (%) | Diffuse light transmittance (%) | Pencil hardness |
|---|---|---|---|---|---|
| Example 1 | 91.6 | 1.1 | 90.6 | 1.0 | 2H |
| Example 2 | 90.8 | 2.4 | 88.7 | 2.1 | HB |
| Comparative Example 1 | 88.3 | 3.8 | 84.9 | 3.4 | — |
| Comparative Example 2 | 90.9 | 1.2 | 89.8 | 1.1 | — |
| Comparative Example 3 | 90.5 | 2.0 | 88.7 | 1.7 | — |

From the measurement results of the arithmetic average waviness (Wa) as indicated in Table 1, it was confirmed that the resin sheets of Examples 1 and 2 of the present invention had less protrusion waviness than the commercially available checker glasses of Comparative Examples 1 to 3. In addition, from the measurement results of the image clarity indicated in Table 2, the excellent image clarity with a small number of protrusion waviness in Examples 1 and 2 was confirmed, and the visibility evaluation results indicated in Table 2 and excellent visibility at a short distance and excellent shielding property at a long distance were confirmed from the photograph in FIG. 6. Further, from the results of Table 3, it was confirmed that the resin sheet of the present invention was excellent with no difference in the optical transmittance even when compared with the glass checker glass and had the excellent surface hardness.

The invention claimed is:

1. A resin sheet which is a checker glass-like resin sheet made of a transparent thermoplastic resin, wherein
   a plurality of sectional arch-shaped elongated protrusions extending in one direction are regularly arranged in rows on one surface of the resin sheet,
   a plurality of sectional arch-shaped elongated protrusions extending in a direction perpendicular to the protrusions arranged on the one surface are regularly arranged in rows, on another surface of the resin sheet,
   an arithmetic average waviness (Wa) at a vertex of the protrusion in a direction in which the protrusion extends is 20 μm or less on both surfaces of the resin sheet, and
   on both surfaces of the resin sheet, a pitch of the protrusions is 10 to 40 mm, and an average height of the protrusions is 300 to 1500 μm.

2. The resin sheet according to claim 1, wherein a ratio of the arithmetic average waviness (Wa) of the vertex of the protrusion to a height of the protrusion on both surfaces of the resin sheet is 5% or less.

3. The resin sheet according to claim 1, wherein the transparent thermoplastic resin is at least one selected from the group consisting of a polystyrene resin, an acrylic resin, and a polycarbonate resin.

4. The resin sheet according to claim 1, wherein a basis weight of the resin sheet is 2,000 to 5,000 g/m².

5. A resin sheet which is a checker glass-like resin sheet made of a transparent thermoplastic resin, wherein
   a plurality of sectional arch-shaped elongated protrusions extending in one direction are regularly arranged in rows on one surface of the resin sheet,
   a plurality of sectional arch-shaped elongated protrusions extending in a direction perpendicular to the protrusions arranged on the one surface are regularly arranged in rows, on another surface of the resin sheet,
   an arithmetic average waviness (Wa) at a vertex of the protrusion in a direction in which the protrusion extends is 20 μm or less on both surfaces of the resin sheet, and a ratio of the arithmetic average waviness (Wa) of the vertex of the protrusion to a height of the protrusion on both surfaces of the resin sheet is 5% or less.

6. The resin sheet according to claim 5, wherein the transparent thermoplastic resin is at least one selected from the group consisting of a polystyrene resin, an acrylic resin, and a polycarbonate resin.

7. The resin sheet according to claim 5, wherein a basis weight of the resin sheet is 2,000 to 5,000 g/m$^2$.

8. A resin sheet which is a checker glass-like resin sheet made of a transparent thermoplastic resin, wherein
    a plurality of sectional arch-shaped elongated protrusions extending in one direction are regularly arranged in rows on one surface of the resin sheet,
    a plurality of sectional arch-shaped elongated protrusions extending in a direction perpendicular to the protrusions arranged on the one surface are regularly arranged in rows, on another surface of the resin sheet,
    an arithmetic average waviness (Wa) at a vertex of the protrusion in a direction in which the protrusion extends is 20 µm or less on both surfaces of the resin sheet, and
    a basis weight of the resin sheet is 2,000 to 5,000 g/m$^2$.

9. The resin sheet according to claim 8, wherein the transparent thermoplastic resin is at least one selected from the group consisting of a polystyrene resin, an acrylic resin, and a polycarbonate resin.

\* \* \* \* \*